US008667089B2

United States Patent
Cho et al.

(10) Patent No.: US 8,667,089 B2
(45) Date of Patent: Mar. 4, 2014

(54) APPARATUS AND METHOD FOR EXECUTING AN APPLICATION

(75) Inventors: Dae-Hyun Cho, Suwon-si (KR); Sung-Do Moon, Seongnam-si (KR); Byung-Chang Cha, Gimpo-si (KR); Sun-Ae Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/846,420

(22) Filed: Jul. 29, 2010

(65) Prior Publication Data
US 2011/0106916 A1    May 5, 2011

(30) Foreign Application Priority Data
Nov. 5, 2009  (KR) .................. 10-2009-0106551

(51) Int. Cl.
*G06F 15/16*    (2006.01)
(52) U.S. Cl.
USPC ......................................... 709/219; 709/226
(58) Field of Classification Search
None
See application file for complete search history.

(56) References Cited

U.S. PATENT DOCUMENTS

| | | | | |
|---|---|---|---|---|
| 5,276,883 | A | * | 1/1994 | Halliwell ................. 709/203 |
| 6,816,895 | B2 | | 11/2004 | Andreakis et al. |
| 2008/0137960 | A1 | | 6/2008 | Lee et al. |
| 2008/0244576 | A1 | | 10/2008 | Kwon et al. |
| 2008/0244579 | A1 | | 10/2008 | Muller |
| 2008/0247344 | A1 | * | 10/2008 | Bahl et al. ................. 370/310 |
| 2008/0301473 | A1 | * | 12/2008 | Perez et al. ................. 713/300 |
| 2009/0172086 | A1 | | 7/2009 | Arthursson et al. |
| 2009/0327495 | A1 | * | 12/2009 | Betts-LaCroix et al. ..... 709/226 |

FOREIGN PATENT DOCUMENTS

| | | |
|---|---|---|
| KR | 10-2003-0011860 | 2/2003 |
| KR | 10-2008-0018025 | 2/2008 |
| KR | 10-2008-0053172 | 6/2008 |
| KR | 10-2008-0088041 | 10/2008 |
| KR | 10-2009-0059851 | 6/2009 |
| WO | WO 2005/062177 | 7/2005 |

* cited by examiner

*Primary Examiner* — Scott Christensen
(74) *Attorney, Agent, or Firm* — NSIP Law

(57) ABSTRACT

Provided are an apparatus and method for executing an application. Using the apparatus and method, an application is executed in a terminal directly, or by receiving a computing service from a remote server. After an execution time and/or power consumption of when the application is executed in the terminal directly, and an execution time and/or power consumption when the computing service is received from the remote server are estimated, one of the application execution methods of the two cases may be selected according to the estimated values. The estimated values may be determined based on a state of the terminal, the quality of service (QoS) state of the remote server, and a characteristic of the application.

14 Claims, 6 Drawing Sheets

APPARATUS AND METHOD FOR EXECUTING AN APPLICATION

CROSS-REFERENCE TO RELATED APPLICATION(S)

This application claims the benefit under 35 U.S.C. §119(a) of Korean Patent Application No. 10-2009-0106551, filed on Nov. 5, 2009, the entire disclosure of which is incorporated herein by reference for all purposes.

BACKGROUND

1. Field

The following description relates to an apparatus and method for executing an application, and more particularly, to application execution technology based on a cloud computing service.

2. Description of the Related Art

Cloud computing service refers to service technology that provides computing resources requested by a user through the Internet at any time and any place.

In the cloud computing service, when a client requests execution of an application, a server executes the application and provides only the result to the client. In other words, a client merely functions as an input/output (I/O) device in the cloud computing service.

Computing resources provided in the cloud computing service may include both of software resources, such as applications and development platforms, and hardware resources, such as central processing units (CPUs), memories, and storages.

Thus, in the cloud computing service, a user terminal can receive the execution result of a specific application using the computing resources of a remote server without performing a specific operation.

Also, since users' data can be stored in a reliable server, the security of the data can be ensured, and even a user who does not have a personal terminal can enjoy a personal computing environment using a public computer connected with the Internet.

SUMMARY

In one general aspect, there is provided an apparatus for executing an application, including: an executor configured to execute an application based on self-processing using a terminal or remote processing using a remote server, and a controller configured to: estimate: a first efficiency of the self-processing of the application, and a second efficiency of the remote processing of the application, and select execution of the application by self-processing or execution of the application by remote processing using the estimated first efficiency and second efficiency.

The apparatus may further include that the first efficiency and the second efficiency are determined based on an execution time of the application and a power consumption of the terminal.

The apparatus may further include that the first efficiency and the second efficiency are determined based on a product or sum of the execution time of the application to which a first weight is given and the power consumption of the terminal to which a second weight is given.

The apparatus may further include a collector configured to collect at least one of: a state of the terminal, a quality of service (QoS) state of the remote server, and characteristic information of the application.

The apparatus may further include that the controller is further configured to estimate the first efficiency and the second efficiency using at least one of: the state of the terminal, the QoS state of the remote server, and the characteristic information of the application received from the collector.

The apparatus may further include that the executor is further configured to execute the application in module units.

The apparatus may further include that the controller is further configured to: estimate the first efficiency and the second efficiency in the module units, and select the execution by self-processing or the execution by remote processing in the module units.

In another general aspect, there is provided a method of executing an application, including: estimating a first efficiency of self-processing of an application using a terminal, estimating a second efficiency of remote processing of the application using a remote server, and selecting execution of the application by self-processing or execution of the application by remote processing using the estimated first efficiency and second efficiency.

The method may further include that the first efficiency and the second efficiency are determined based on an execution time of the application and a power consumption of the terminal.

The method may further include that the first efficiency and the second efficiency are determined based on a product or sum of the execution time of the application to which a first weight is given and the power consumption of the terminal to which a second weight is given.

The method may further include collecting at least one of: a state of the terminal, a quality of service (QoS) state of the remote server, and characteristic information of the application.

The method may further include estimating the first efficiency and the second efficiency using at least one of: the state of the terminal, the QoS state of the remote server, and the characteristic information of the application received from the collector.

The method may further include executing the application in module units.

The method may further include: estimating the first efficiency and the second efficiency in the module units, and selecting the execution by self-processing or the execution by remote processing in the module units.

Other features and aspects will be apparent from the following detailed description, the drawings, and the claims.

Figure 1:
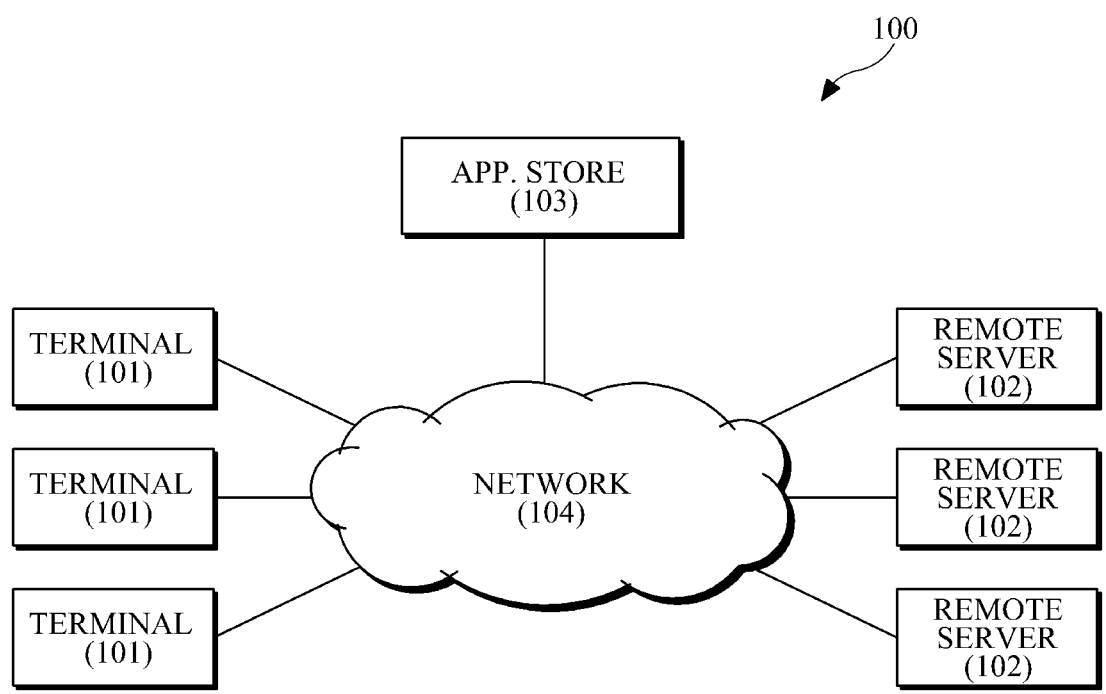
FIG. 1 is a block diagram of an example system for executing an application.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1 is a block diagram of an example system for executing an application.

In FIG. 1, a system 100 for executing an application may include a terminal 101, a remote server 102, and an application ("App.") store 103, and the terminal 101, the remote server 102, and the App. store 103 may be connected via a network 104.

The App. store 103 may provide a variety of application download services. Applications provided by the App. store 103 may be written in a platform-independent code that may be executed regardless of the type of a central processing unit (CPU) or operating system (OS).

The terminal 101 may download an application from the App. store 103 and may execute the downloaded application. In the current example, the terminal 101 may execute the downloaded application in two methods.

In the first method, the terminal 101 may execute an application directly. This method will be referred to as "execution by self-processing." For example, a virtual machine installed in the terminal 101 may convert a platform-independent code and then may execute an application directly.

In the second method, the remote server 102 may execute an application. This method will be referred to as "execution by remote processing." For example, when the terminal 101 transfers an application and initial input value to the remote server 102, the remote server 102 may execute the application and then provide the result of the execution operation to the terminal 101.

In this example, the terminal 101 may selectively use one of the methods according to a state of the terminal 101, the quality of service (QoS) state of the remote server 102, and a characteristic of an application (or respective modules of the application).

Figure 2:
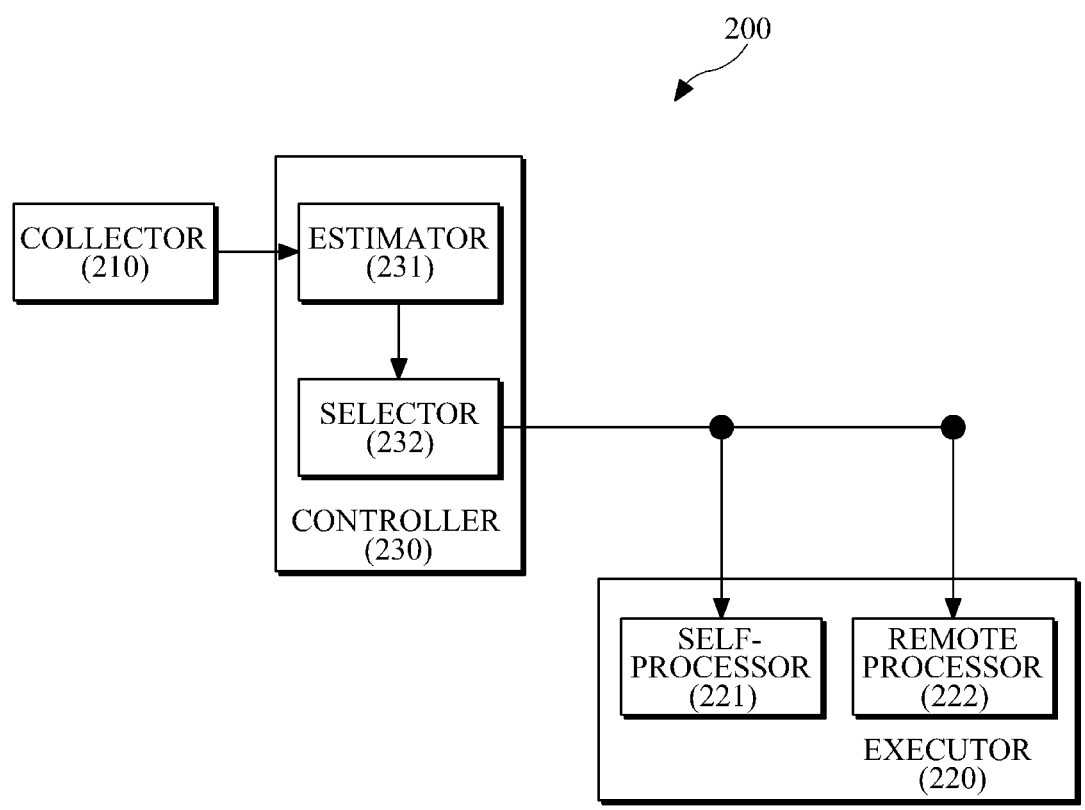
FIG. 2 is a block diagram of an example apparatus for executing an application.

FIG. 2 is a block diagram of an example apparatus for executing an application. This may be a constitution of the virtual machine installed in the terminal 101 of FIG. 1.

In FIG. 2, an apparatus 200 for executing an application may include a collector 210, an executor 220, and a controller 230.

The collector 210 may collect a state of the terminal 101, the QoS state of the remote server 102, and a characteristic of an application according to an application execution request.

For example, the state of the terminal 101 may be the computing power of a CPU for the terminal 101, the amount of available memory/storage/power, an access speed of the network 104, and so on. The collector 210 may request the OS of the terminal 101 to dynamically obtain the state of the terminal 101.

The QoS state of the remote server 102 may be the computing power of a CPU for the remote server 102, the amount of available memory/storage, an access speed of the network 104, and so on. The collector 210 may request the OS of the remote server 102 to dynamically obtain the QoS state of the remote server 102, or may statically use information stored in is advance.

Also, the characteristic of an application may be the size of an application code for the application or each module of the application, the required amount of computing, the required amount of buffer memory or storage, the degree of user interaction, the amount of input/output (I/O) data, and so on. When the application is downloaded from the App. store 103, the collector 210 may obtain the characteristic of the application using hardware requirements.

The executor 220 may execute the application by self-processing or remote processing.

In one example, "execution by self-processing" denotes that a self-processor 221 executes an application directly, and "execution by remote processing" denotes that a remote processor 222 transfers an application and initial input value to the remote server 102 and receives the result of executing the application from the remote server 102. It may be selected by a control signal of the controller 230 whether to execute the application by self-processing or remote processing.

The controller 230 may estimate the efficiency of a situation in which the terminal 101 executes the application directly and the efficiency of a situation in which the remote server 102 executes the application and provides only the result to the terminal 101, compare the estimated efficiencies with each other, and select one of the self-processor 221 and the remote processor 222. For example, the efficiencies may be the execution time of the application and the power consumption of the terminal 101.

For example, an estimator 231 may receive the state of the terminal 101, the QoS state of the remote server 102, the characteristic of the application from the collector 210, and may estimate a first efficiency and a second efficiency using the received information. The first efficiency may be the execution time of the application and the power consumption of the terminal 101 when the application is executed by self-processing (e.g., the terminal 101 may execute the application directly). On the other hand, the second efficiency may be the execution time of the application and the power consumption of the terminal 101 when the application is executed by remote processing (e.g., the remote server 102 may execute the application and transfer only the result to the terminal 101). A selector 232 may compare the estimated first efficiency with the estimated second efficiency and may select execution by self-processing or execution by remote processing.

Also, when the application includes a plurality of modules, the example apparatus 200 for executing an application may estimate efficiencies and select an execution method in module units. Thus, when the example apparatus 200 for executing an application is applied to a cloud computing service environment, it may be possible to adaptively select an application execution method, that is, an application may be executed directly or by receiving a remote computing service.

Figure 3:
FIG. 3 illustrates example efficiencies.

FIG. 3 illustrates example efficiencies.

In FIG. 3, a first efficiency E1 may be determined based on an execution time T1 and a power consumption P1. The execution time T1 may be obtained when the terminal 101 executes an application directly. For example, the execution time T1 may be obtained based on the computing power of the CPU of the terminal 101, the amount of computing required for the application, and so on. The power consumption P1 may be the power consumption of the terminal 101 when the terminal 101 executes the application directly. For example, the power consumption P1 may be calculated based on the amounts of CPU use, memory use, storage use, network use, etc., of the application.

In FIG. 3, a second efficiency E2 may be determined based on an execution time T2 and a power consumption P2. The execution time T2 may be obtained when the remote server 102 executes the application. For example, the execution time T2 may be obtained based on the computing power of the CPU of the remote server 102, a delay in transmitting and receiving the application and I/O data between the terminal 101 and the remote server 102, a network access speed, and so on. The power consumption P2 may be the power consumption of the terminal 101 when the remote server 102 executes the application. For example, the power consumption P2 may be calculated based on the power consumption of the terminal 101 in a standby mode, a power consumed for transmitting and receiving the application and I/O data, the amount of network use, and so on.

For example, when the execution time T1 is estimated to be one (1) second and the power consumption P1 is estimated to be 1 mWh in a case where the application is executed by self-processing, the first efficiency E1 is one. In another example, when the execution time T2 is estimated to be two (2) seconds and the power consumption P2 is estimated to be 1 mWh in a case where the application is executed by remote processing, the second efficiency E2 is 0.5. In one example, as the first efficiency E1 is higher than the second efficiency E2, the controller 230 may control the application to be executed by self-processing.

In FIG. 3, each efficiency may be defined to be the reciprocal of the product of an execution time and power consumption, but is not limited to such a value. For example, each efficiency may be defined using the sum of the execution time and power consumption.

Meanwhile, an execution time and power consumption may be in a trade-off relationship, as in a case where the execution time is short but the power consumption is large, or the execution time is long but the power consumption is small. In one example, predetermined weights (e.g., a and b) may be given to the execution time and power consumption, respectively.

Alternatively, when an execution time and power consumption are in the trade-off relationship, the same weight may be given to the execution time and power consumption, the result values may be provided to a user, and then one of values may be selected by the user.

Figure 4:
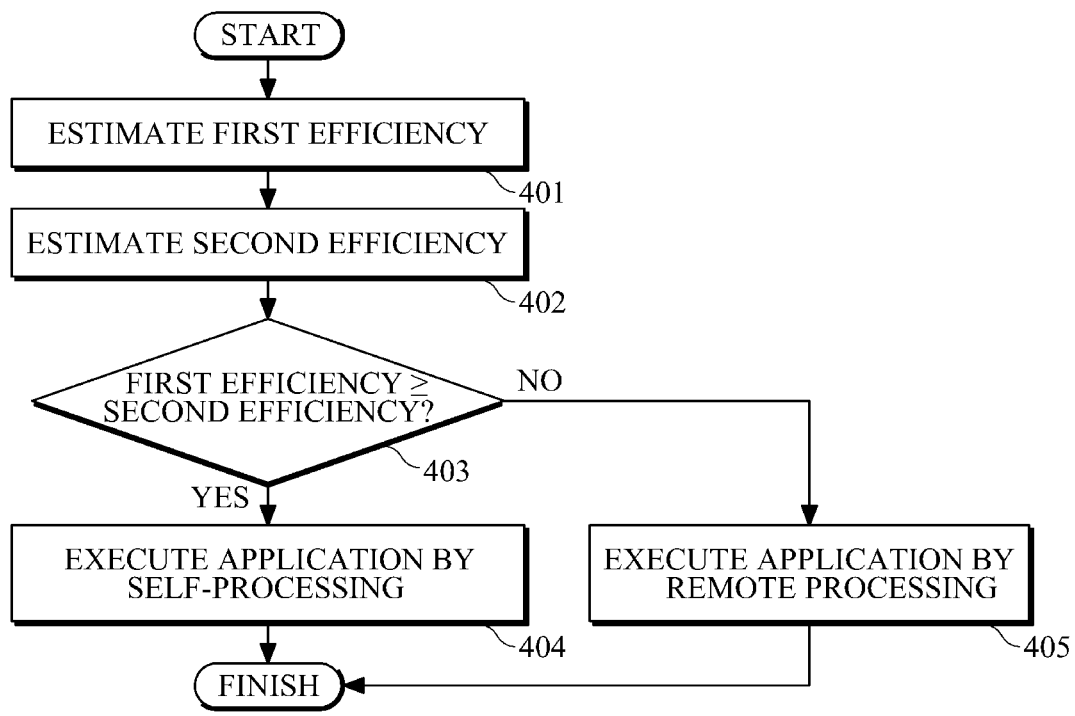
FIG. 4 illustrates an example method of executing an application.

FIG. 4 is a flowchart illustrating an example method of executing an application.

In FIG. 4, in operation 401, when there is an application execution request, the first efficiency of self-processing of an application using the terminal 101 may be estimated. For example, the controller 230 may estimate the execution time and power consumption of a case where the application is executed by the terminal 101.

In operation 402, the second efficiency of remote processing of the application using the remote server 102 may be estimated. For example, the controller 230 may estimate the execution time and power consumption of a case where the application is executed by the remote server 102.

In operation 403, the first efficiency and the second efficiency may be compared with each other.

In operation 404, in response to the first efficiency being equal to or larger than the second efficiency, the application may be executed by self-processing. Otherwise, in operation 405, the application may be executed by remote processing. For example, according to a command of the controller 230, one of the self-processor 221 and the remote processor 222 may selectively operate to process the application.

Figure 5A:
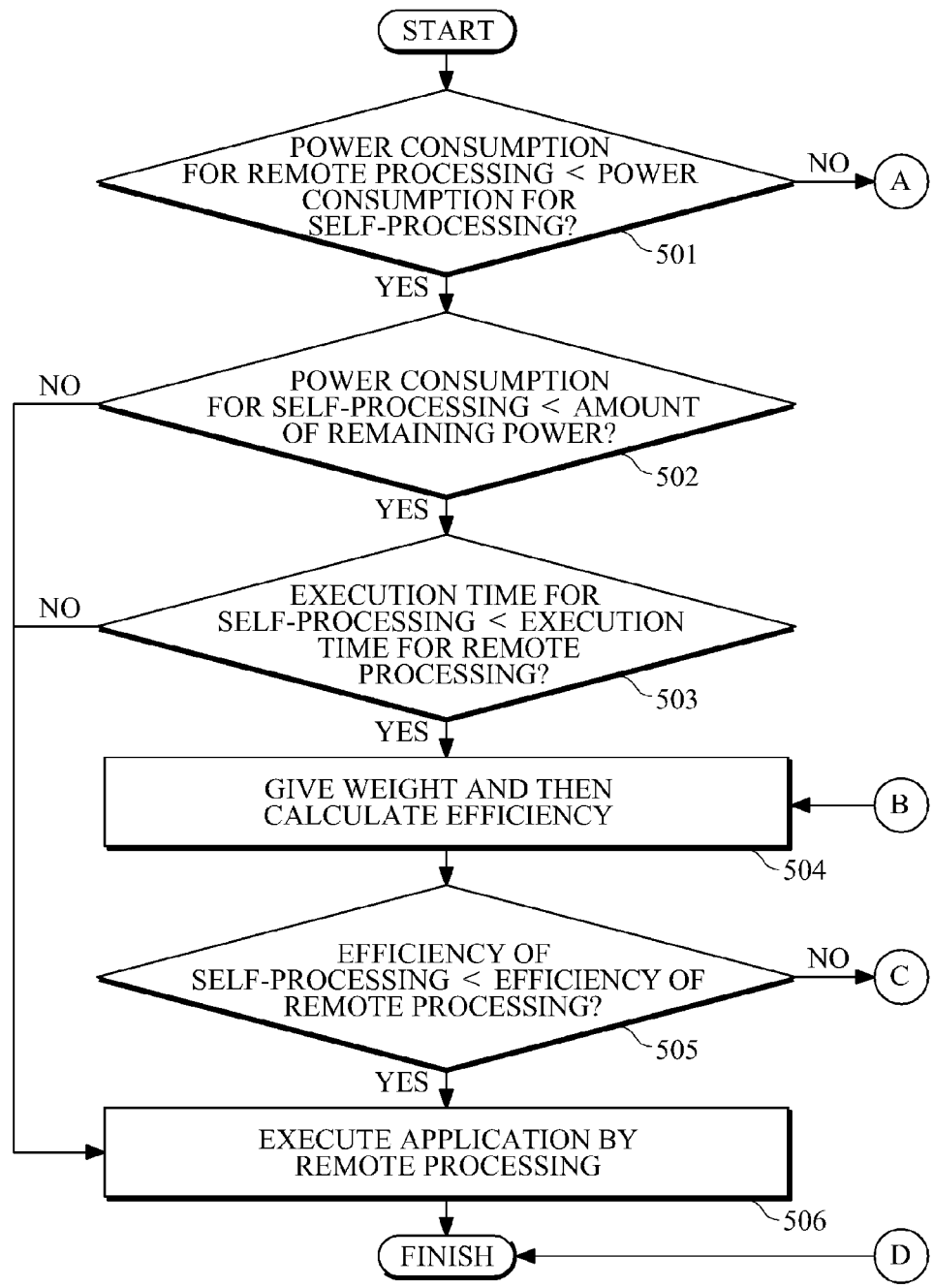
FIGS. 5A and 5B illustrate another example method of executing an application.
Figure 5B:
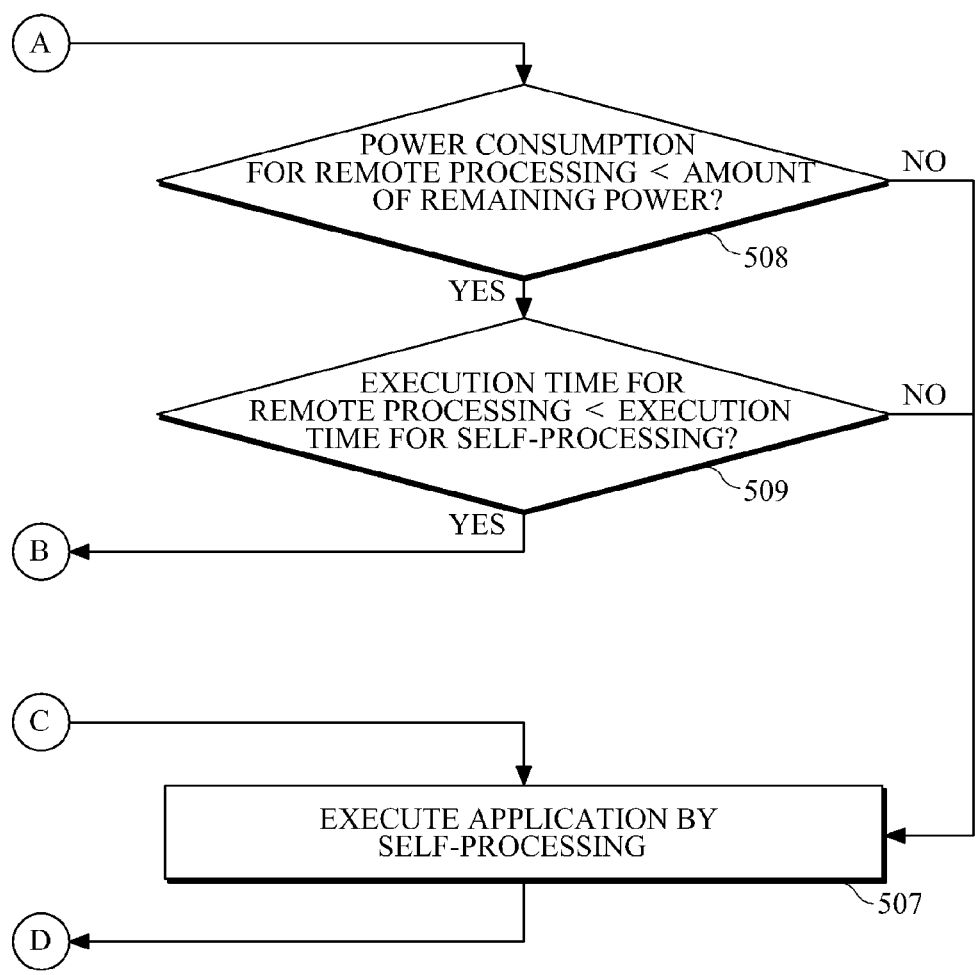

FIGS. 5A and 5B illustrate another example method of executing an application.

In FIGS. 5A and 5B, in operation 501, in response to there being an application execution request, a power consumption for remote processing and a power consumption for self-processing may be compared with each other. For example, the power consumptions may be estimated values of the amount of power required by the terminal 101 when an application is executed.

In operation 502, in response to the power consumption for remote processing being less than that of self-processing, the power consumption for self-processing may be compared with the amount of remaining power. For example, the amount of remaining power may be an estimated value of the remaining power of the terminal 101.

In operation 506, in response to the power consumption for self-processing being greater than the amount of remaining power, the application may be executed by remote processing. Alternatively, in operation 503, in response to the power consumption for self-processing is less than the amount of remaining power, an execution time for self-processing may be compared with an execution time for remote processing.

In operation 506, in response to the execution time for self-processing being longer than the execution time for remote processing, the application may be executed by remote processing. Alternatively, in operation 504, in response to the execution time for self-processing being shorter than the execution time for remote processing, a predetermined weight may be given to the power consumptions and the execution times, and then efficiencies may be calculated.

In operation 505, the efficiency of self-processing may be compared with that of remote processing.

In operation 506, in response to the efficiency of self-processing being lower than that of remote processing, the application may be executed by remote processing. Alternatively, in operation 507, in response to the efficiency of self-processing being higher than that of remote processing, the application may be executed by self-processing.

In operation 508, in response to it being determined in operation 501 that the power consumption for remote processing is greater than that of self-processing, the power consumption for remote processing may be compared with the amount of remaining power.

In operation 507, in response to the power consumption for remote processing being greater than the amount of remaining power, the application may be executed by self-processing. Alternatively, in operation 509, in response to the power consumption for remote processing being less than the amount of remaining power, the execution time for remote processing may be compared with the execution time for self-processing.

In operation 507, in response to the execution time for remote processing being longer than the execution time for self-processing, the application may be executed by self-processing. Alternatively, in operation 504, in response to the execution time for remote processing being shorter than the execution time for self-processing, a predetermined weight may be given to the power consumptions and the execution times, and then efficiencies may be calculated.

In operation 505, the efficiency of self-processing may be compared with that of remote processing.

In operation 506, in response to the efficiency of self-processing being lower than that of remote processing, the application may be executed by remote processing. Alternatively, in operation 507, in response to the efficiency of self-processing being higher than that of remote processing, the application may be executed by self-processing.

In other words, between execution by self-processing and execution by remote processing, an execution method that ensures short execution time and little power consumption may be selected. However, when an execution time and power consumption are in the trade-off relationship, an execution method may be selected based on efficiencies calculated using a weight.

When the terminal 101 is applied to a cloud computing service environment and executes an application, it may be possible to select a method in which the terminal 101 executes the application by receiving a remote computing service or a method in which the terminal 101 executes the application directly, and execute the application.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for executing an application, the apparatus comprising:
    a collector, of a terminal, configured to collect a state of a cloud computing environment, a state of the terminal, and characteristic information of the application;
    an executor, of the terminal, configured to execute the application by the terminal or by the cloud computing environment; and
    a controller, of the terminal, configured to:
        estimate:
            a first efficiency of self-processing of the application using the terminal based on at least the state of the terminal and the characteristic information of the application, wherein the first efficiency is also estimated based on an estimate of a power consumption of the terminal when the application is executed by the terminal; and
            a second efficiency of remote processing of the application using the cloud computing environment based on at least the state of the cloud computing environment and the characteristic information of the application, wherein the second efficiency is also estimated based on an estimate of a power consumption of the terminal when the application is executed by the cloud computing environment; and
        select execution of the application by the terminal or execution of the application by the cloud computing environment using the estimated first efficiency and second efficiency, wherein:
    execution of the application by the terminal is selected if the power consumption for the terminal to execute the application by remote processing exceeds the terminal's remaining power supply.

2. The apparatus of claim 1, wherein:
    the first efficiency is determined based on an execution time of the application when the application is executed by the terminal, and
    the second efficiency is determined based on an execution time of the application when the application is executed by the cloud computing environment.

3. The apparatus of claim 2, wherein the first efficiency and the second efficiency are determined based on a product or sum of the execution time of the application to which a first weight is given and the power consumption of the terminal to which a second weight is given.

4. The apparatus of claim 1, wherein the state of the cloud computing environment comprises a quality of service (QoS) state of the cloud computing environment.

5. The apparatus of claim 1, wherein the executor is further configured to execute the application in module units.

6. The apparatus of claim 5, wherein the controller is further configured to:
    estimate the first efficiency and the second efficiency in the module units; and
    select the execution by the terminal or the execution by the cloud computing environment in the module units.

7. The apparatus of claim 1, wherein the estimate of the first efficiency is further based upon the degree of user interaction expected to complete the execution of the application.

8. A method of executing an application, the method comprising:
collecting, by a collector of a terminal, a state of a cloud computing environment, a state of the terminal, and characteristic information of the application;
estimating, by an estimator of the terminal, a first efficiency of self-processing of the application using the terminal based on at least the state of the terminal and the characteristic information of the application, wherein the first efficiency is also estimated based on an estimate of a power consumption of the terminal when the application is executed by the terminal;
estimating, by the estimator of the terminal, a second efficiency of remote processing of the application using the cloud computing environment based on at least the state of the cloud computing environment and the characteristic information of the application, wherein the second efficiency is also estimated based on an estimate of a power consumption of the terminal when the application is executed by the cloud computing environment; and
selecting, by a selector of the terminal, execution of the application by the terminal or execution of the application by the cloud computing environment using the estimated first efficiency and second efficiency, wherein execution of the application by the terminal is selected if the power consumption for the terminal to execute the application by remote processing exceeds the terminal's remaining power supply.

9. The method of claim 8, wherein:
the first efficiency is determined based on an execution time of the application when the application is executed by the terminal, and
the second efficiency is determined based on an execution time of the application when the application is executed by the cloud computing environment.

10. The method of claim 9, wherein the first efficiency and the second efficiency are determined based on a product or sum of the execution time of the application to which a first weight is given and the power consumption of the terminal to which a second weight is given.

11. The method of claim 8, wherein the state of the cloud computing environment comprises a quality of service (QoS) state of the cloud computing environment.

12. The method of claim 8, further comprising executing the application in module units.

13. The method of claim 12, further comprising:
estimating the first efficiency and the second efficiency in the module units; and
selecting the execution by the terminal or the execution by the cloud computing environment in the module units.

14. The method of claim 8, wherein the estimate of the first efficiency is further based upon the degree of user interaction expected to complete the execution of the application.

* * * * *